United States Patent [19]
Meyer

[11] 3,863,788
[45] Feb. 4, 1975

[54] DEPANNING MACHINE

[75] Inventor: Alfred L. Meyer, Libertyville, Ill.

[73] Assignee: Anetsberger Brothers, Inc., Northbrook, Ill.

[22] Filed: June 27, 1973

[21] Appl. No.: 373,973

[52] U.S. Cl..................... 214/302, 198/23, 214/314
[51] Int. Cl............................................ B65g 47/82
[58] Field of Search ........... 214/302, 312, 313, 314; 198/21, 23

[56] References Cited
UNITED STATES PATENTS

| | | | |
|---|---|---|---|
| 1,227,764 | 5/1917 | Dupuy | 214/314 |
| 1,906,126 | 4/1933 | Mott | 214/307 |
| 1,954,278 | 4/1934 | Adams | 198/23 |
| 2,639,827 | 5/1953 | Otte | 214/314 |
| 2,649,058 | 8/1953 | Holbeck | 214/314 |
| 2,715,973 | 8/1955 | Winfree et al. | 214/314 |
| 3,257,017 | 6/1966 | Ridder | 214/314 |
| 3,709,386 | 1/1973 | Jones | 214/314 |
| 3,774,791 | 11/1973 | Bornfleth | 214/302 |

Primary Examiner—Albert J. Makay
Assistant Examiner—Lawrence J. Oresky
Attorney, Agent, or Firm—Davis, McCaleb & Lucas

[57] ABSTRACT

Machine for removing biscuits from baking pans including a platform, belt conveyor serially delivering biscuit-containing pans to platform, pan swinging means having magnetic arms pivoted at one edge of platform and disposed in slots therein, loader operable in response to delivery of pan onto platform to slide pan laterally onto magnetic arms which swing up and out to dump biscuits therefrom onto biscuit transfer tray and then return emptied pan to platform, second pan conveyor offset from and parallel to first, a pan ejector slides emptied pan from platform onto second conveyor, and a third belt conveyor below second, the transfer tray being pivotally supported at inner edge on pivoted arms swung down after receiving biscuits top side down and then pivotally tilted inwardly to deposit same onto the third conveyor top side up.

12 Claims, 6 Drawing Figures

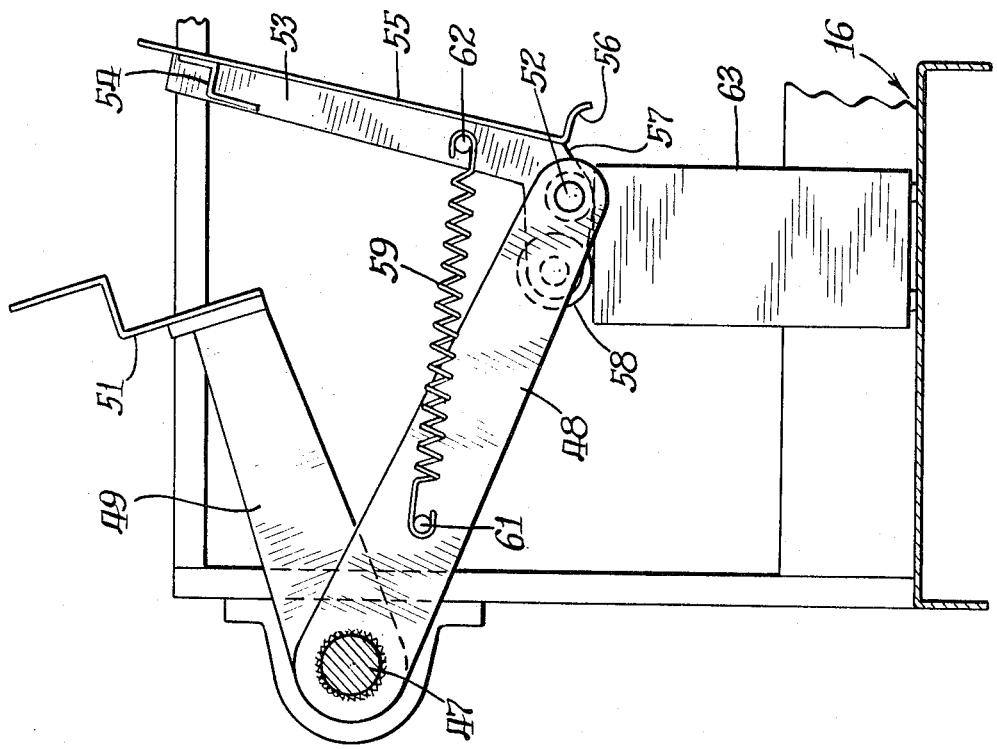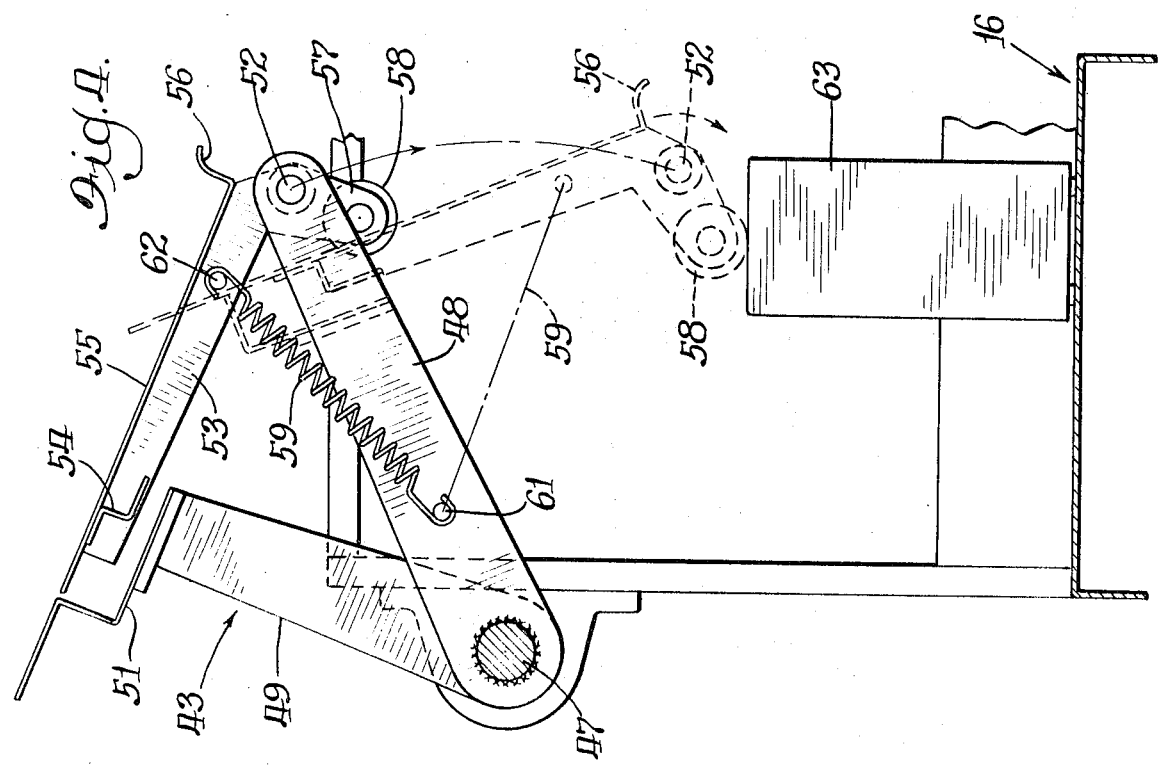

3,863,788

DEPANNING MACHINE

BACKGROUND OF THE INVENTION

1. Field of the Invention

This invention relates generally to bakery equipment, and more particularly to removing biscuits or the like from the pans in which they have been baked.

2. Description of the Prior Art

Machines heretofore employed for depanning biscuits or the like have lifted or sucked up the biscuits out of their pan from above with subatmospheric air pressure as the pan is carried by an endless belt conveyor, and then deposited the biscuits onto another conveyor by releasing that air pressure. This has many obvious disadvantages, including damaging some types of baked goods and the incapability of so handling others, as those that are made of separable portions or layers which would thereby be pulled apart.

SUMMARY OF THE INVENTION

The present invention eliminates the disadvantages of the prior art by turning the pans over to deposit the baked goods top side down onto the tray of a transfer means and then moving the tray to deposit those goods top side up on a conveyor. More specifically, it employs three conveyors, one for serially delivering pans containing the baked goods, such as biscuits, to a platform, a second for carrying away emptied pans, and a third for receiving the depanned baked goods, together with loader means operable to move a pan laterally on the platform onto pan swinging means which turns the pan over to place the baked goods top side down on the transfer means and returns the thus emptied pan to the platform, and pan ejector means for moving the empty pan onto the second conveyor, the transfer means in the meantime depositing the baked goods on the third conveyor top side up.

In the drawings:

FIG. 4 is a detail front elevation of the transfer means with its tray in upper biscuit receiving position;

FIG. 5 is a view similar to FIG. 4 with the tray in its lower biscuit delivering position.

DESCRIPTION OF THE PREFERRED EMBODIMENT

Figure 1:
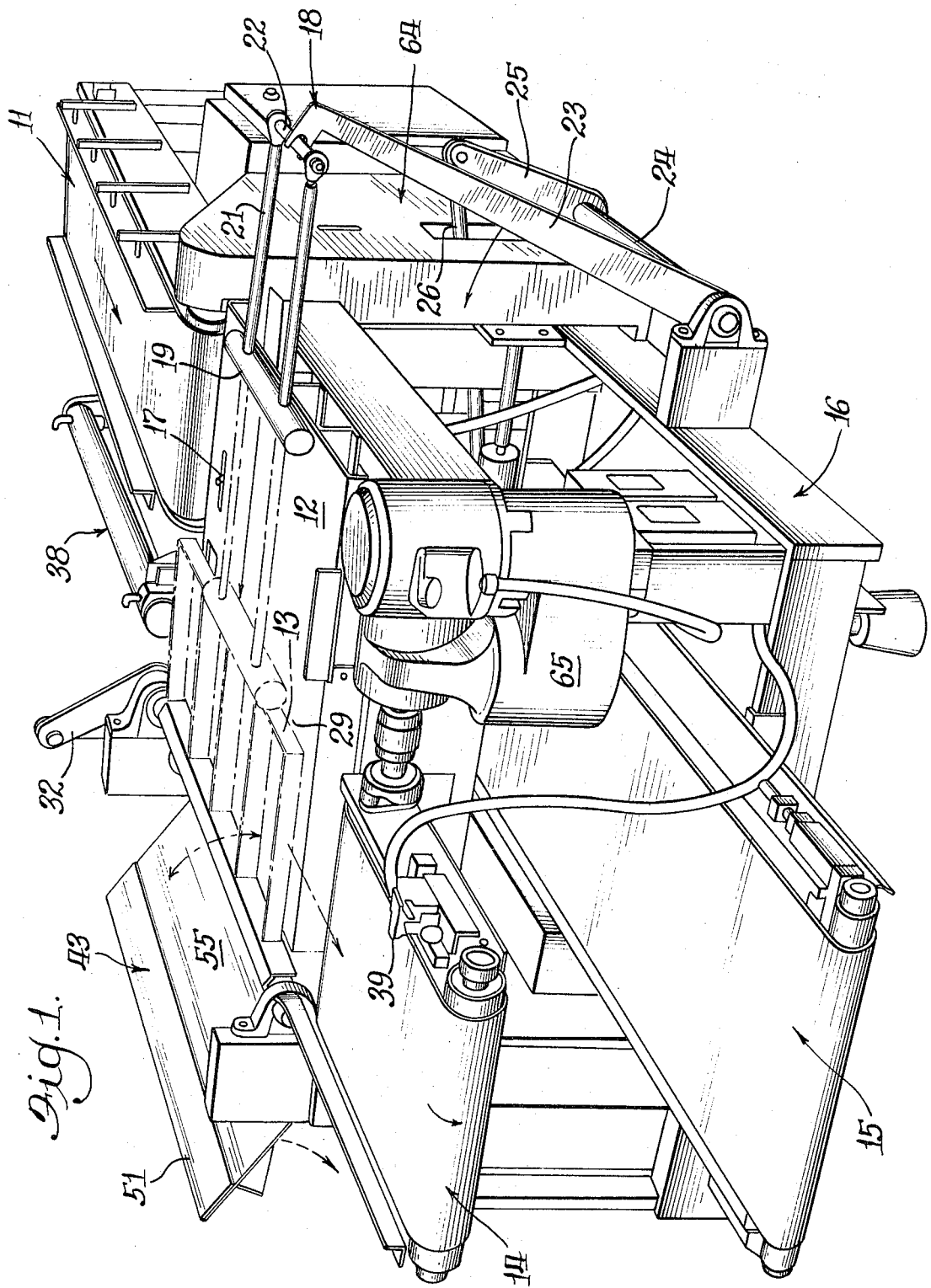
FIG. 1 is a perspective view of a depanning machine embodying the features of the invention as seen from the front righthand corner.

Referring more particularly to FIG. 1, the embodiment of the invention therein illustrated comprises an infeed belt conveyor 11 for delivering pans containing baked products, such as biscuits, to a platform 12. Such a pan is illustrated at the left side that platform 12 in FIG. 1 and is indicated by reference numeral 13. A second conveyor means in the form of a belt conveyor 14 is disposed at the forward edge of the platform 12, and a third conveyor means for the depanned biscuits designated by reference numeral 15 is mounted below the empty pan conveyor 14. All of these conveyors and the platform 12 are supported by a suitable frame structure indicated generally by reference numeral 16.

As a pan containing biscuits is delivered from the oven by the infeed conveyor means 11, it drops onto the platform 12 and closes a normally open pan drop or platform microswitch 17 to close the same. The closing of switch 17 inititates operation, in a manner later to be described in detail, of loader means indicated generally by reference numeral 18 which comprises a pusher member 19 connected by links 21 to a yoke 22 pivotally connected to the upper end of a loader arm 23. At its lower end, the loader arm 23 is connected to a horizontal shaft 24 that it is pivotally mounted in any suitable manner at the lower righthand side of the machine and is oscillated by an arm 25 secured at its lower end thereto. The upper end of the arm 25 is pivotally connected by a link 26 to a crank that is rotated by a main motor means 27 (FIG. 2) through a normally deenergized loader clutch 28 (FIG. 6) in a manner to be described in greater detail hereinafter.

Figure 2:
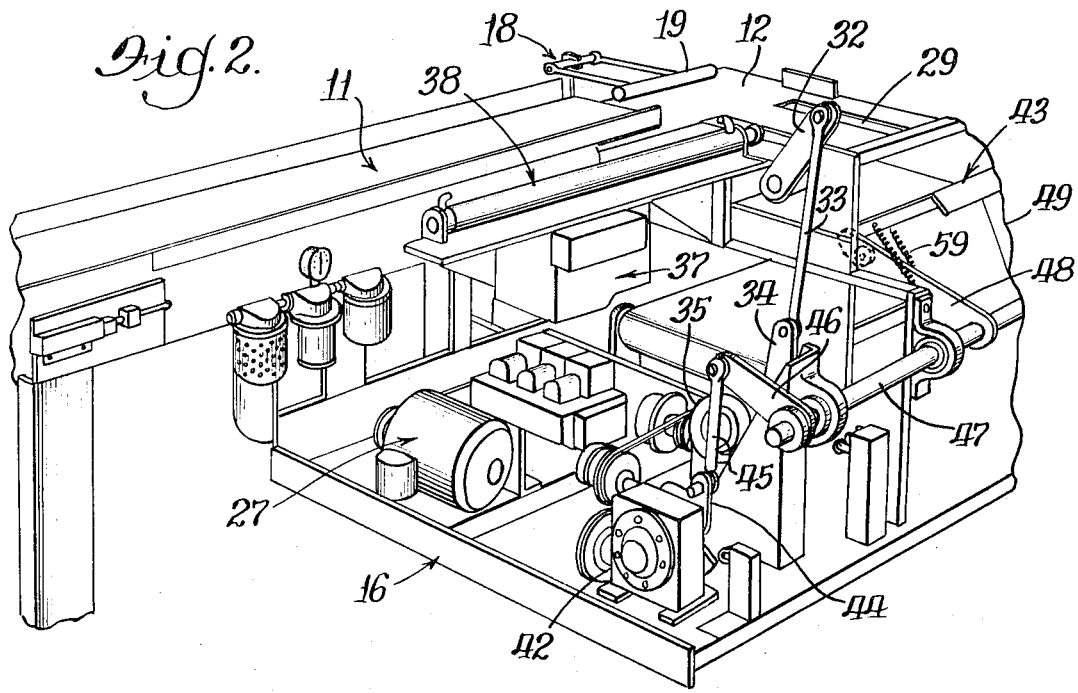
FIG. 2 is a perspective view of a part of the machine as seen from its lefthand rear corner opposite to, and on a smaller scale than, FIG. 1.
Figure 6:
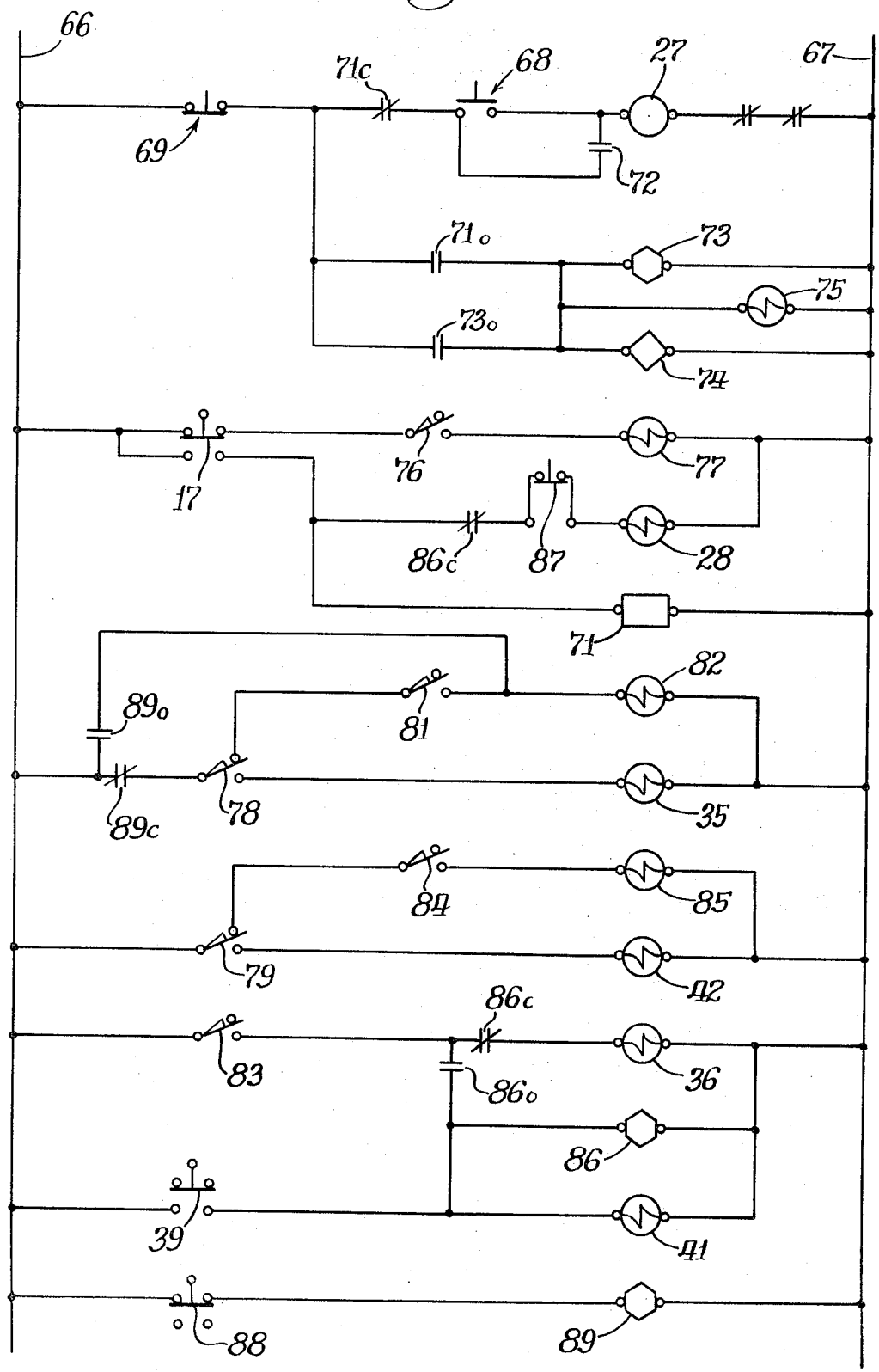
FIG. 6 is a schematic wiring diagram.

Energization of that loader clutch 28 in response to closing of the pan drop switch 17 thus results in movement of the pusher member 19 from its normal full line position of FIG. 1 to its dotted line position therein to move the pan that closed the switch 17 laterally on the platform 12 onto a pan swinging means comprising a pair of magnetic swing arms 29 disposed in suitable transverse recesses in the platform 12 so that their upper surfaces are slightly below the upper surface of the platform. The outer ends of those arms 29 are secured to a longitudinal shaft 31 suitably journaled on the machine frame 16 and secured at its rear end to a link 32 (FIGS. 1-3) which is connected by a rod 33 to a crank arm 34 rotatable by the main motor means 27 through a normally deenergized swinging means or swing arm clutch 35 (FIGS. 2 and 6). In a manner later to be described in detail, movement of the loader means 18 to its broken line position of FIG. 1 energizes this clutch 35 to cause upward and outward swinging of the arms 29 on the pivotal axis of the shaft 31 to turn the pan 13 over to dump the biscuits therefrom and return the thus emptied pan to the platform 12.

As the swing arms 29 are thus returned to their normal position, a normally deenergized cylinder eject solenoid 36 (FIG. 6) is energized. Suitable air pressure supply means, indicated generally by reference numeral 37 in FIG. 2 which is actuated by the main motor means 27 to maintain a supply of air under pressure in well known manner, is connected through suitable hoses and normally closed control valves to each end of a double-acting cylinder and piston 38 (FIGS. 1-3) mounted at the left side of the machine parallel to the conveyors 11 and 14 and slightly above the platform 12. This cylinder and piston 38 comprises pan ejector means operable to move the emptied pan from the platform 12 forwardly onto the second or pan conveyor 14. When the swing arm means fires the eject solenoid 36 as previously noted, the latter opens the control valve in the hose leading to the rear end of the cylinder 38 to cause the piston therein to be moved forwardly to effect such movement of the emptied pan from the platform 12 onto the second conveyor means 14. As the emptied pan thus is cleared from the platform 12, it closes a normally open switch 39 (FIGS. 1 and 6) to energize a normally deenergized cylinder return solenoid 41. Such actuation of this solenoid 41 opens the control valve in the hose leading to the forward end of the cylinder 38 to return the eject piston to its inactive rearward position. This conditions the mechanism to receive a succeeding filled pan and move the same laterally of the platform 12 onto the swing arms 29.

Figure 3:
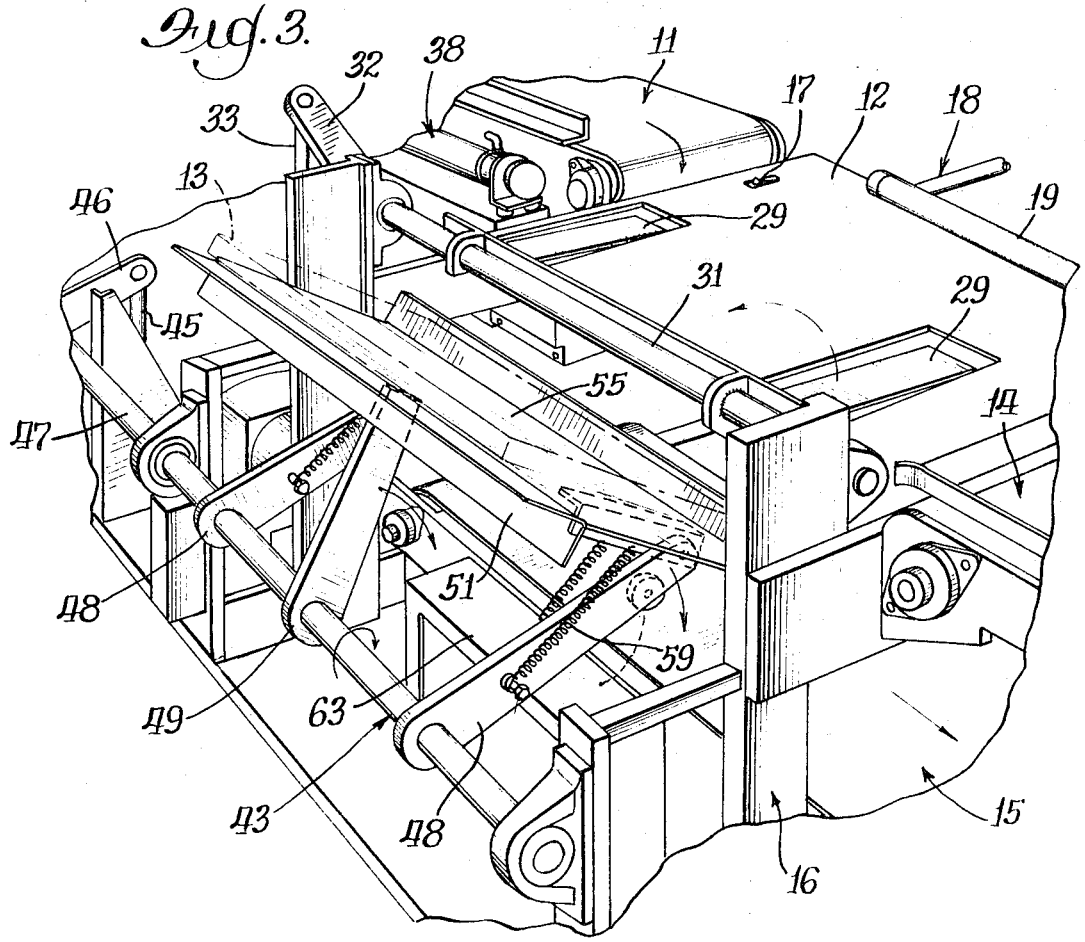
FIG. 3 is a perspective view of a part of the machine from its front lefthand corner on substantially the same scale as FIG. 1.

In the meantime and during the previous operation of the swing arms 29, a normally deenergized dump arm or transfer clutch 42 is fired in response to swinging of the arms 29 over center. When so energized, the clutch 42 causes cyclic operation of biscuit transfer means indicated generally by reference numeral 43 by the main motor means 27. This is accomplished through the agency of a crank arm 44 (FIG. 2) and a link 45 interconnecting the same with an arm 46 secured to the rear end of a shaft 47 that is journaled in any suitable manner on the machine frame and extends longitudinally along the left side thereof. Referring more particularly to FIGS. 3–5, the lower ends of a pair of links 48 and of an intermediate arm 49 rigidly connected in any suitable manner to the shaft 47. Secured to the upper portion of the arm 49 is a longitudinally extending bumper bracket 51, and the upper end of each of the links 48 is pivotally connected at 52 to a dump pan arm 53. The free ends of the arms 53 are connected by a longitudinally extending rail 54, and the arms and this rail carry a longitudinally extending tray 55. As best seen in FIGS. 4 and 5, the inner, lower end of the tray 55 terminates in a flange 56. Each of the arms 53 has an extension 57 carrying a pivotally mounted roller 58, and suitable springs 59 are interconnected between pins 61 and 62 carried by the arms 48 and 53, respectively.

When the several parts are in normal at rest position, as illustrated in FIGS. 3 and 4, the tray 55 which extends longitudinally adjacent the lefthand edge of the platform 12 is in position to receive the contents of a pan 13 as it is swung outwardly and turned over by the magnetic swing arms 29. The biscuits or other contents of the pan are thereby dumped onto the tray 55 top side down, the thus emptied pan being returned to the platform by the swing arms 29 as previously noted. Also as previously indicated, the dump arm clutch 42 is energized when the arms 29 initially pass vertical position to initiate a cycle of operations of the transfer means 43. This comprises the downward swinging of links 48 and the arm 49 about the longitudinal axis of the shaft 47 to carry the tray 55 below the platform 12. As these parts approach their lowermost positions, the rollers 58 contact a bracket 63 to swing the tray 55 on its pivots 52 relative to the links 48 and arm 49 and against the action of the springs 59, as shown in FIG. 5. Such movement of the tray 55 transfers the biscuits therefrom onto the third conveyor means 15 top side up. Return movement of the shaft 47 by continued operation of the crank mechanism 44–46 will carry the links 48 and arm 49 back to their normal position of FIG. 4 and, as the rollers 58 are lifted from contact with the bracket 63, the springs 59 will reengage the tray rail 54 with the bumper bracket 51 on the upper end of the arm 49. It will be appreciated that both the flange 56 on the tray 55 and the contacting of the rollers 58 with the bracket 63 will assure proper removal of the biscuits from the tray and delivery thereof onto the biscuit conveyor 15.

In addition to the main motor means 27 which actuates all of the previously described mechanisms except the conveyor means, a variable speed driving means generally designated numeral 64 and which may be of any desired construction, is provided for actuating both the infeed conveyor means 11 and the third or biscuit conveyor 15. A separate second variable speed driving means 65 (FIG. 1) is provided for actuating the second or empty pan conveyor 14. Like the main motor means 27, the motors for these drives 64, 65 are supplied by a suitable source of electricity which is indicated in FIG. 6 as comprising the two lines 66 and 67. A start switch 68 is shown in that schematic wiring diagram in series with an emergency stop switch 69, the main motor 27 and the normally closed contact 71c of a time delay relay 71, holding contacts 72 of a well known starter being connected in parallel with the start switch 68. The time delay relay 71 is energized when the pan drop switch 17 is closed so that if a malfunction occurs and that pan drop switch remains closed, the time delay relay 71 operates to open the circuit to the main motor 27 by opening the contacts 71c and, by closing its normally open contacts 71o, to energize a jam up latching relay 73. Normally open contacts 73o of that relay are connected in series with an alarm horn 74 and an alarm air solenoid 75.

As previously noted, closing of the pan drop micro switch 17 normally only is continued until the pan is moved therefrom by the loader means 18 and functions to energize the loader clutch 28. As soon as the loader means 18 approaches its normal position during return movement, it closes a loader arm switch 76 is series with the now closed pan drop switch 17 to momentarily energize a loader arm brake 77.

As also previously noted, the loader means 18 functions to fire the swing arm clutch 35, this being accomplished by its closing of a normally open micro switch 78 near the end of operative movement of the pusher member 19 to its broken line position of FIG. 1. As the swing arms 29 go past center during their operation, they close a micro switch 79 to energize the dump arm clutch 42 as previously noted. Near the end of their return movement, the swing arms 29 close a micro switch 81 to energize a swing arm brake 82, since the micro switch 78 will by then have returned to its normal position of FIG. 6. And as previously noted, as the swing arms 29 return to their normal position to return the emptied pan to the platform 12, they actuate another micro switch 83 to energize the cylinder eject solenoid 36.

In the meantime, return of the transfer means 43 to its normal position closes a micro switch 84 to energize a dump arm or transfer brake 85, switch 79 by then having been returned to its normal position of FIG. 6. It previously has been indicated that closing of switch 39 by a pan that has been moved onto the pan conveyor 14 fires the cylinder return solenoid 41. As seen in FIG. 6, this also energizes a cylinder eject relay 86 which opens its normally closed contacts 86c that are in series with the cylinder eject solenoid 36 and closes its normally open contacts 86o to maintain the cylinder return solenoid 41 energized so long as the switch 83 is maintained closed by the pan swinging means 29.

A safety feature is provided in the form of a normally closed micro switch 87 in series with the loader clutch 28 which is opened so long as a pan is on the swing arms 29 so that if another pan onto platform 12 to close switch 17 while a pan is still on the swing arms 29, the loader clutch 28 will not be energized. The normally closed contacts 86c of the cylinder eject relay 86 also are connected in series with the switch 87 so that if the cylinder eject relay 86 is maintained energized by the switch 39 being held closed, as by a pan because of a malfunction of conveyor means 14, those contacts 86c will be opened to prevent operation of clutch 28 and loader means 18.

It is thought that the invention and many of the attendant advantages will be understood from the foregoing description, and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. A machine for removing biscuits from baking pans, comprising a platform, infeed conveyor means for serially delivering biscuit-containing pans to said platform, pan swinging means mounted adjacent a lateral edge of said platform, loader means operable in response to delivery of a pan by said conveyor means to said platform to move said pan laterally onto said pan swinging means to enable the latter to turn said pan over to dump the biscuits therefrom and return the thus emptied said pan to said platform, a second conveyor means, pan ejector means operable to move said emptied pan from said platform onto said second conveyor means, a third biscuit conveyor means below and longitudinally aligned with said infeed conveyor means, and transfer means normally disposed in substantial horizontal alignment with said platform for receiving said biscuits from said pan, as the latter is turned over by said pan swinging means, and means for lowering said transfer means below said infeed conveyor means and tilting the same inwardly to deposit said biscuits onto said biscuit conveyor means.

2. A machine according to claim 1, wherein said transfer means comprises tray means for receiving said biscuits top side down, and dumping means for moving said tray means to deposit said biscuits top side up on said biscuit conveyor means.

3. In a machine according to claim 1, a first variable speed driving means for said infeed and biscuit conveyors, and a second variable speed driving means for said biscuit conveyor means.

4. In a machine according to claim 3, a main motor means for operating said loader means, said pan swinging means, said pan ejector means, and said transfer means.

5. A machine according to claim 4, wherein said pan ejector means comprises a double-acting cylinder and piston, and air pressure supply means for actuating the same.

6. In a machine according to claim 4, a normally de-energized loader clutch interposed between said main motor means and said loader means, and a platform switch operable by a pan delivered to said platform to energize said loader clutch.

7. In a machine according to claim 4, a normally de-energized swinging means clutch interposed between said main motor means and said pan swinging means and energized in response to operation of said loader means.

8. In a machine according to claim 4, a normally de-energized transfer clutch interposed between said main motor means and said transfer means and energized in response to operation of said pan swinging means.

9. A machine according to claim 5, wherein said pan ejector means comprises an eject solenoid operable in response to return movement of said pan swinging means to admit air from said supply means to the rear end of said cylinder.

10. A machine according to claim 9, wherein said pan ejector means comprises a return solenoid operable in response to movement of a pan onto said second conveyor means to admit air from said supply means to the front end of said cylinder.

11. In a machine according to claim 10, wherein said pan ejector means includes a switch operable by said pan swinging means, a relay having normally closed contacts between said switch and said eject solenoid and normally open contacts between said switch and said return solenoid and operable in response to holding said switch closed to deenergize said eject solenoid and energize said return solenoid.

12. In a machine according to claim 6, a normally closed safety switch in series with said loader clutch and opened whenever a pan is on said pan swinging means to prevent energizing of said loader clutch in response to closing of said platform switch.

* * * * *